US010740725B2

(12) United States Patent
Jain et al.

(10) Patent No.: US 10,740,725 B2
(45) Date of Patent: Aug. 11, 2020

(54) RE-ENGINEERING USER LOGIN / REGISTRATION PROCESS FOR JOB APPLICATIONS

(71) Applicant: Indeed Ireland Operations, Ltd., Dublin (IE)

(72) Inventors: Kshitij Jain, Washington, DC (US); Scott Garrett, Kingwood, TX (US)

(73) Assignee: INDEED IRELAND OPERATIONS, LTD. (IE)

( * ) Notice: Subject to any disclaimer, the term of this patent is extended or adjusted under 35 U.S.C. 154(b) by 755 days.

(21) Appl. No.: 14/055,444

(22) Filed: Oct. 16, 2013

(65) Prior Publication Data

US 2014/0114871 A1    Apr. 24, 2014

Related U.S. Application Data

(60) Provisional application No. 61/716,477, filed on Oct. 19, 2012.

(51) Int. Cl.
*G06Q 10/00* (2012.01)
*G06Q 10/10* (2012.01)

(52) U.S. Cl.
CPC ................. *G06Q 10/1053* (2013.01)

(58) Field of Classification Search
CPC ....... H04W 8/02; H04W 12/06; H04W 12/02; H04W 4/21; H04L 63/08; H04L 67/22; G06Q 30/02; G06Q 40/02; G06Q 30/0601; G06Q 40/00; G06Q 40/12; G06Q 10/1053; G06F 21/31; G06F 21/41

USPC ........................................ 705/719, 720, 721
See application file for complete search history.

(56) References Cited

U.S. PATENT DOCUMENTS

| 6,785,679 | B1 | 8/2004 | Dane et al. |
| 6,996,561 | B2 | 2/2006 | De Hilster et al. |
| 7,016,853 | B1 | 3/2006 | Pereless et al. |
| 7,437,309 | B2 | 10/2008 | Magrino et al. |
| 7,505,919 | B2 | 3/2009 | Richardson |
| 7,650,286 | B1 | 1/2010 | Obeid |
| 7,711,573 | B1 | 5/2010 | Obeid |
| 7,805,382 | B2 | 9/2010 | Rosen et al. |
| 8,117,024 | B2 | 2/2012 | Dane |
| 8,121,851 | B2 | 2/2012 | Andino, Jr. et al. |
| 8,145,575 | B1 | 3/2012 | Johnson et al. |
| 8,234,221 | B2 | 7/2012 | Obeid |
| 8,271,473 | B2 | 9/2012 | Berg |
| 8,280,823 | B1 | 10/2012 | Obeid |
| 8,364,702 | B2 | 1/2013 | Kerr et al. |

(Continued)

FOREIGN PATENT DOCUMENTS

WO    WO 2011/097510 A2    8/2011

OTHER PUBLICATIONS

"Indian visa application go online. Khaleej Times; Dubai. Oct. 17, 2011".*

*Primary Examiner* — Gabrielle A McCormick

(57) ABSTRACT

An on-line job application process that encourages participants to provide as much information as possible before drop-offs occur, by requesting access to authentication information such as social network identity, and moving an Applicant Tracking System login step to near the end. If a drop off does occur, a dummy email address can then be associated with the user to enable subsequent follow up.

19 Claims, 6 Drawing Sheets

(56) References Cited

U.S. PATENT DOCUMENTS

| | | | |
|---|---|---|---|
| 8,600,931 B1* | 12/2013 | Wehrle | G06Q 10/1053 707/607 |
| 9,043,870 B1* | 5/2015 | Barenholz | H04L 63/0815 726/2 |
| 2002/0111958 A1 | 8/2002 | Hartman et al. | |
| 2006/0018441 A1* | 1/2006 | Timmins | H04M 3/4211 379/88.12 |
| 2006/0143228 A1 | 6/2006 | Odio-paez et al. | |
| 2008/0052098 A1 | 2/2008 | Malnati et al. | |
| 2008/0208907 A1 | 8/2008 | Tolve et al. | |
| 2009/0125484 A1 | 5/2009 | Carrieri | |
| 2009/0228297 A1 | 9/2009 | Mcgovern et al. | |
| 2010/0241581 A1 | 9/2010 | Duraiswamy et al. | |
| 2011/0022450 A1* | 1/2011 | Meredith | G06Q 10/10 705/14.4 |
| 2011/0196801 A1 | 8/2011 | Ellis et al. | |
| 2011/0196802 A1 | 8/2011 | Ellis et al. | |
| 2011/0209068 A1 | 8/2011 | Vemuri | |
| 2012/0023030 A1 | 1/2012 | Jeffries | |
| 2013/0310115 A1 | 1/2013 | Schneider | |
| 2013/0054483 A1 | 2/2013 | Ali et al. | |

\* cited by examiner

RE-ENGINEERING USER LOGIN / REGISTRATION PROCESS FOR JOB APPLICATIONS

CROSS REFERENCE TO RELATED APPLICATION(S)

This application claims priority to and the benefit of a prior U.S. Provisional patent Application Ser. No. 61/716,477 filed Oct. 19, 2012 entitled "Re-engineering User Login/Registration Process for Job Applications", the entire contents of which are incorporated by reference herein.

BACKGROUND

1. Technical Field

This patent application relates to on-line job application processes, and in particular to a front end interface for an Applicant Tracking System (ATS).

2. Background Information

A job seeker and/or person otherwise using a resource such as the Internet now is typically learns about available jobs from multiple sources, including search engines, recruitment websites, emails, chat rooms, forum postings, social networks, and the like. All of these sources converge into a job description page of employer who is offering the opportunity that he or she wants to apply to. Once the user clicks on the apply button or link he is then initiated into what is generally known as a job application process.

Current job application processes require a person (whether an active or passive job seeker) to fill out a lot of details before the job application can be considered successfully submitted. Most sophisticated companies make use of an Applicant Tracking System (ATS) software application for handling job application details and resume tracking. A number of software companies now actually specialize in the business of supplying ATS systems and services to others, including Taleo (now part of Oracle), Kenexa (now part of IBM). HR Smart, SuccessFactors (now part of SAP), ICIMS, Maxhire, and others. It is estimated that at the present time, more than 10,000 employers have deployed some type of an ATS to manage this application process.

The objective of any ATS system is to capture all user applicant information in a structured format so that recruiters can then perform searches on it. However, ATS systems are designed in the first instance to be sold to employers, and thus they are not known to be very user friendly to job applicants. ATS systems almost always require a job seeker to create a login/password as a first step before gaining access to the detailed application process. In requiring this, the application process from the perspective of a job seeker using an ATS has become cumbersome and non-intuitive. The specific application process may vary from one ATS provider to another ATS provider, and it can also differ from one employer to another using the same ATS provider based on customizations built-in by the employer. However almost all ATS processes have common attributes that discourage applicants from completing the process.

SUMMARY

Problems with Prior Approaches

Now, one might assume that any active job seeker who is either out of job or looking to change, would gladly do whatever is required to complete the application process using an ATS—no matter how painful and involved it is. However, most recruiters and companies want to target the passive seekers who are not actively looking for jobs but are really great candidates. The problem with the current process is that even though these passive seekers want to submit their application for a particular job, they have no patience to go through a new user login/password registration process or go through a lengthy application process.

Indeed, we have discovered that the initial login step is one of the steps in the whole application process where majority of "drop-offs" for a job application process happens. We believe that early drop-offs in a job recruiting process are higher as compared to other types of websites such as social network sites, job boards, e-commerce sites, financial (banking) websites and the like, for at least the following reasons:

1. Internet form filling. Internet forms are typically simple to fill out and are designed from the start with the user experience in mind. In contrast, no other form filing activity on the Internet is as tedious and time consuming as a job application process.

2. Repeat visits to websites. Often-visited websites such as LinkedIn or Facebook are used repeatedly and thus a person tends to remember their username and password, or stores them in a way that can be easily retrieved. On the other hand, one does not apply to a job everyday nor visit job sites as regularly as social networking sites. Therefore there is little to no incentive to recall username/password combinations.

3. Site visits with end objectives. On job boards and social networking sites alike, the user expects to come back and start from where they left off. Is not with an end objective and does not harm the user to drop midway. On the other hand interaction with an ATS is concluded only when the job applicant completes the entire application cycle. Dropping midway does not get registered in the employers ATS as a complete application which means that the user is not considered for a job.

4. Importance/criticality. Bank or trading sites require the user to fill out forms for access to more services. Because the criticality of the nature of information stored user either stores the login information where can be remembered or retrieved easily. While applying to it job in one company simply isn't as important as a person's financial information. Therefore there is little or no incentive to remember login details. A job seeker might be applying to jobs in more than one company which makes it difficult to store each login information; this progressively reduces the importance to store login information of any given company job application.

5. Preparedness. Thanks and even some government tasks also use forms (for example adding a recipient for funds transfer) or Department of Motor Vehicles forms. In this case the user is prepared to commit the time required to fill out the form, knowing that the information is actually needed and they will typically conscientiously take the time needed. On the other hand users are not prepared for the complexity and demand for the long time it takes to fill out different job applications for different employers. As a result, users of ATS tend to run out of patience and quit before the process is complete.

6. Historical context. Job boards started the process of capturing resumes. They is are the followed the existing norm at the time could be intended to capture the user's email and other basic details such as their name, location and so forth upfront immediately. Therefore even if a user drops out job boards can still engage in marketing campaigns and send job alerts to induce the user to apply to a specific job. On the other hand ATS systems perhaps blindly copied the same mechanism as that of a job or because they evolved later in time but without thinking of their difference in context.

7. Awareness. Normally most of the websites where one creates a user account are consumer sites where the brand is known upfront. Uses would not typically create a login for a site where they don't know anything about it. On the other hand job seekers have no clue that there are applicant tracking system companies that power a recruiting process in the background for employers. ATS work behind the scenes are in the business-to-business world and are not visible to end-users. As a result ATS systems do not realize the need to create store and remember user logins.

8. Purpose. A user will normally create an on-off user logins and ones that one intends to use again and again. On the other hand applying to a job at a company is always almost always a "one-off" operation and a person does not typically apply to the same company multiple times. For example, on average, companies have less than a 3% return user rate applying for the same job in less than a year. Even those 3% who return do not have an intention to come back and apply to another job. Therefore when they first need to create a login to apply for a job, they make one "on-the-fly", not bothering to remember or store it for their next visit(s).

9. Email as universal identity. Most people normally only use one personal email identifier for most Internet transactions. Indeed, email has a most become a universally unique identifier (UUID) for a person. Even if the person has more than one email ID, they normally only use one email for job related purposes. As a result, a job seeker will try to create the new user information needed for a job but without realizing that he or she has already created another ID while applying to another company that uses the same ATS which is in operation behind both company's websites.

10. Human error. Human errors are applicable in any login process for any website. These occur if a user makes a typographical mistake, remembers login information correctly or generally forgets. In such a situation, the user might become frustrated or decide not to move ahead with the job application process considering the additional hassle creating a new user ID. Because a user is applying to it job he may not consider it to be as critical as for example paying a parking ticket.

Summary of Technical Solutions

The solution suggested to these and other problems is to move a user login page/screen to the end of a job application process that is a front end to, or otherwise incorporated into an Applicant Tracking System (ATS). Reversing the former typical process—by sending the user login exchange to the end of the process instead of at the beginning, allows one to reliably eliminate drop-offs at the user login screen stage.

The difference with prior approaches is that complete applicant information can be captured and sent to the employers Applicant Tracking System (ATS), even without login information. On the other hand, when the a user login is the first required step of the job application process, there is no user information to be sent to ATS of the employer at that stage. Subsequent return visits by the same user would thus require reentering the same information all over again.

Therefore, the approach described here produces ideal/ desired results and brings more successful applications through to an employer. Our solution here removes an bottleneck in current ATS systems. It can:

1. Simplify the job application process by streamlining the process both on mobile devices, a tablet, and on a desktop;

2. Authenticating & verification of the user as a real user can be accomplished by introducing a social network (e.g. LinkedIn) sign-in option, providing a single ID that can be universally used for all the companies job sites (or even other companies using the same ATS). The single ID can be used to retrieve and pre-fill the available information from the LinkedIn profile and a service provider's database. Additional information sources such as job board sign-in's, Google IDs, Dropbox, Facebook, Twitter, etc., login credentials can also be used to verify the authenticity of the job applicant.

3. Step 2 removes the requirement to ask a user to login in a first step by authenticating the user, allowing prefilling of information another way, and hence allowing one to move the login/password step to the very end of the process.

In one particular implementation, a method for submitting information to a job Application Tracking System (ATS) begins by initially validating a user's identity via a source other than via direct input from the user and other than via an ATS login and password information. The process continues without having user login information, by presenting job application questions including job screening questions to the user in an interactive, on-line presentation format. After collecting the user's answers to the job application questions, the process then requests the user to further verify their identity such as by entering ATS login credentials.

If the user drops off from the application process before entering answers to the is all of job application questions or after entering answers to all of the job application questions but before moving to the login page/screen, the process automatically creates a dummy login name for the user. The process then submits the collected information to the ATS with either the user-entered ATS login credentials or the dummy login name.

The initial identification information can come from information associated with the user's social network identity that the user has given permission to share, even if that information does not include an email address.

If the user drops off from answering job application questions, and a user-provided email address does not exist in the ATS, then an email address provided by a social network credential is used to identify the user, and an auto-created ATS user login is then associated with that email address.

However, if the user drops off from answering job application questions, and a user provided email address already exists in the ATS, then the process creates a dummy email address and attaches that with the users original email.

BRIEF DESCRIPTION OF THE DRAWINGS

The description below refers to the accompanying drawings, of which.

DETAILED DESCRIPTION OF AN ILLUSTRATIVE EMBODIMENT

Introduction

Briefly, an Applicant Tracking System (ATS) operating according to the teachings herein moves a typical login/password interaction step to be at or near a last step in a job application process, together with a back end authentication management application.

This approach makes a mobile device and even a desktop driven application process more effective by leveraging the power of social networking sites such as LinkedIn, Twitter, and Facebook—or even other information-rich sources which can be deployed for user authentication with the authenticated application then interacting with is the ATS on the back end. In the past, a login/password was required as the first step in an ATS process to identify the candidate to prefill the fields in the application process (where the information was available). However with the introduction of LinkedIn or other social sites (that can provide a single ID that can be universally used for all employer's job sites), we move the ATS systems login/password step near or at the very end of the process.

Figure 1A:
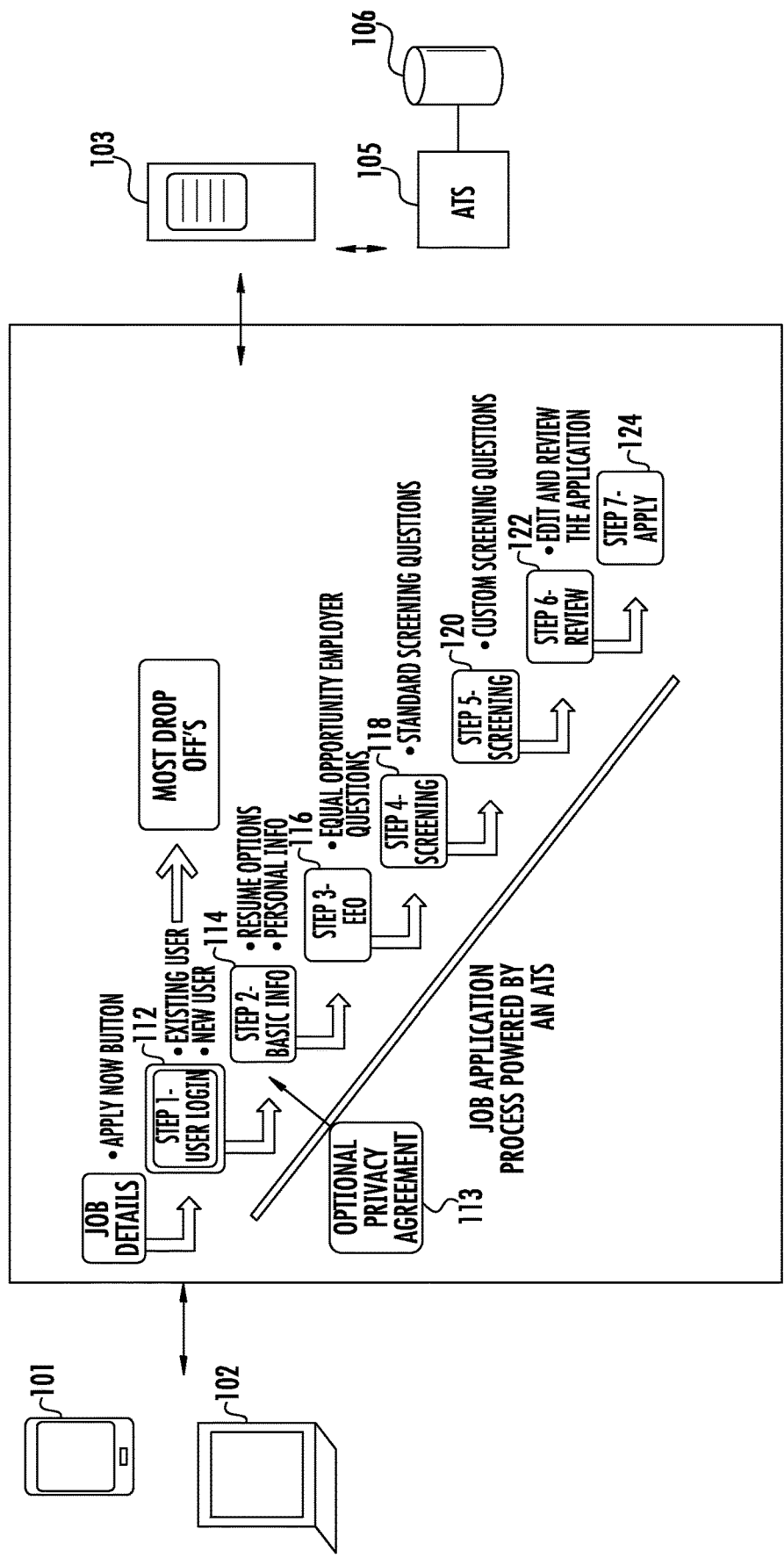
FIGS. 1A and 1B are a high level process flow of a typical online job application process showing where most user drop-offs occur in an Applicant Tracking System (ATS)

FIG. 1A illustrates a typical known job application process. Job seekers (also called applicants herein) typically use a mobile device such as a smartphone or tablet 101 or other computing device such as a laptop 102 to complete online job applications. The applicant, using their device 101, 102 interacts with an employer's website 103, which may have an Applicant Tracking System (ATS) 105 behind it. The applicant fills out the job application electronically using the Internet-connected devices 101, 102, and then submits the application, which sends the applicants information to the ATS 105 which stores the information in an applicant information database 106.

The job application process typically consists of filling in personal information, uploading a resume, and other information that the employer would like to have to determine a person's candidacy. Once a candidate completes the application process, the ATS 105 may perform other tasks (not of critical importance here) such as screening resumes in the database 106 for keywords and relevant experience. For example, if a biotech firm is hiring a statistician, it may disqualify those who call themselves 'numerical modelers.' After the ATS screening is complete, a applications are reviewed by a hiring manager who accesses the database 106 (such as through another interface to the ATS 105) and decides which candidates they would like to interview. Candidates are invited to interview for the opening, and one person is offered the position.

In the conventional login model for the application process, once a user has seen the details of an online job posting, the job seeker begins the process shown such as by selecting an "apply now" button in step 110. The applicant is then brought to a webpage allowing him to interact with the ATS 105 (or via the employer's website 103 acting as a front end to the ATS 105).

In a next step 112, the user is asked to engage in a login process. A job seeker user might be provided a few options to login, such as via an existing login that the user has already established with the ATS, or via a social networking sites login (if that is the user login identified by the ATS as a default. Otherwise, a new user needs to create a login/password. Again depending on the ATS, this login could be (i) an existing login of a validating social site like LinkedIn, etc., or (ii) creating a brand new one login using, for example, an email address as a unique identifier which is also used for weeding off duplications. The ATS 105 is then able to prefill any fields in the application that were already provided, once an existing user has been identified.

In step 113, the applicant is asked to consent to a Privacy Agreement governing the use of his personal information.

In step 114 the user is asked for personal information typically listed on a resume such as their full legal name, location, home address, phone number, social security number, and the like. The user may also be asked about certain basic information such as past work or military experience, previous experience in the company or its subsidiaries, work authorizations, education, certifications, skills, and the like.

In step 116 the ATS will then ask the user certain questions about their ethnicity status to comply with Equal Employment Opportunity (EEO) regulations; similar questions may be presented as to citizenship, passport, and work visa status.

In step 118 a screening process may include Basic Standard Screening questions is that the employers might want to ask all job seekers.

In step 120, Custom Screening questions that are for the specific job, location, function or category.

In step 122 the applicant reviews and edits their prior answers, provides additional information, and attaches other documents such as a resume, cover letter, college transcripts, etc.

In step 124, finally, the job seeker is brought to an application submission and confirmation page, to complete the process.

Figure 1B:
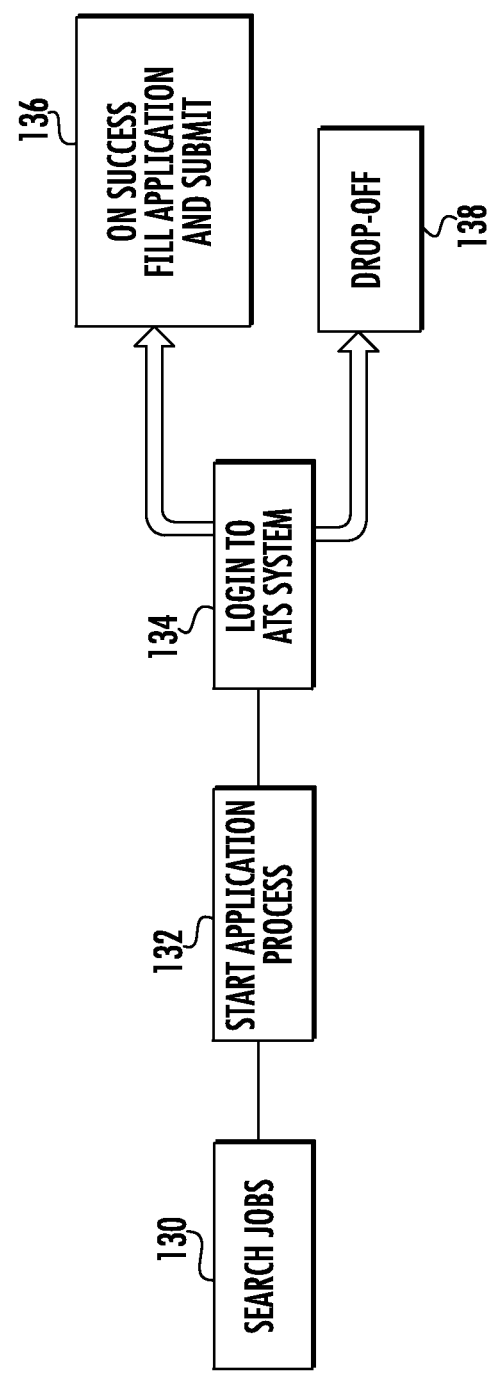

FIG. 1B shows a more detailed view of the initial process from the perspective of the job applicant (rather than from the perspective of ATS provider or the employer), The process consists of searching for a job 130, starting an application process 132 via an ATS or employer's website, and then logging in 134. If the login is successful, the applicant then fills out and submits an application 136. However, if the login fails, the applicant likely drops off 138. Indeed, we have realized that a significant number of drop-offs in the job application process happens right at or near the earliest step, the login/signup step 112 (or possibly even the privacy agreement step). When the drop-off happens, the ATS 105 is unable to collect additional information on the applicant.

Detailed Description of an Example Implementation

We have realized that several problems exist with prior ATS systems as follows:

A. ATS companies, as a result of being a Business-to-Business (B2B) player, are known to most large employers, but are not known to the "common man" who is also a job applicant. The common man has no way to find if the ATS of company 'A' (a company he previously applied and created a new user login) is the same as the ATS used by company 'B' (a company where he wants to apply for the first time). Also, the common man would be unaware that ATS companies (such as Taleo) deploy a universal login feature which means that once a user has used an email to create a user name, the user can input the user name to apply to a job of any other company using Taleo' system. As a result, the common man type of applicant gets rejected while trying to create the user name in company 'B' application because he used the same email while applying to a job in company 'A'. What makes the matters worse is he has not intended to remember the login of company 'A' because applying to a specific company is not a repetitive process. As a result, the user of company B's job application site gets frustrated and drops-off (majority of the cases); in another scenario he uses another email to create a new login.

B. A significant number of drop-offs 138 happen in the job application process at the ATS login/password step 112—which in the past has been the first step in the process.

C. If a drop-off happens in this first step, then no additional information is collected on the job seeker.

D. This login step 112 was necessary to pre-fill the information that was already available in the existing ATS systems.

The solution we provide here reorganizes the job application login process. With the emergence of LinkedIn, Facebook, etc. as frequently visited social networking sites, most people have started to keep their information current there. They use these sites very often to login in to many different types of channels. In order to make a job application process more streamlined and effective, our approach leverages information available on and/or from these social sites (requiring only a one time request for granting access to the social site profile). The information received from the social networking site is now used to authenticate a job applicant, to pre-fill the application steps and is information available in job application databases and other sources like Monster, Career Builder, past visits to Applicant Tracking Systems, etc.

The re-engineered process enables the following:

1. A job-seeker can now apply to a job without filling out many forms, and in less than a minute, on the move with the information available to the system (for example—the job seeker may apply while riding in a train or on a bus, etc.)

2. When done filling out information, if the job seeker remembers the ATS login/password, he can submit the application form to the ATS system by logging directly to ATS system from our separate "back end" authentication management application.

3. In cases where a job seeker decides to drop off before providing login/password information for any reason, the system can now provide two options to get the job seeker's information to employer/recruiter, either
    (a) provide the incomplete application data to the employer/recruiter (which will not be in their ATS systems); or
    (b) create a "dummy", automatically generated login/password to complete the ATS application process, sharing the auto created login/password information with the job seeker on an email ID that is associated with the job seeker's social network profile, and also linking the two in our backend system for future repeat use.

With the redesigned process described here, information that would have been lost because the user never went past the login screen and dropped off will now be available to recruiters and employers for follow ups.

Figure 2A:
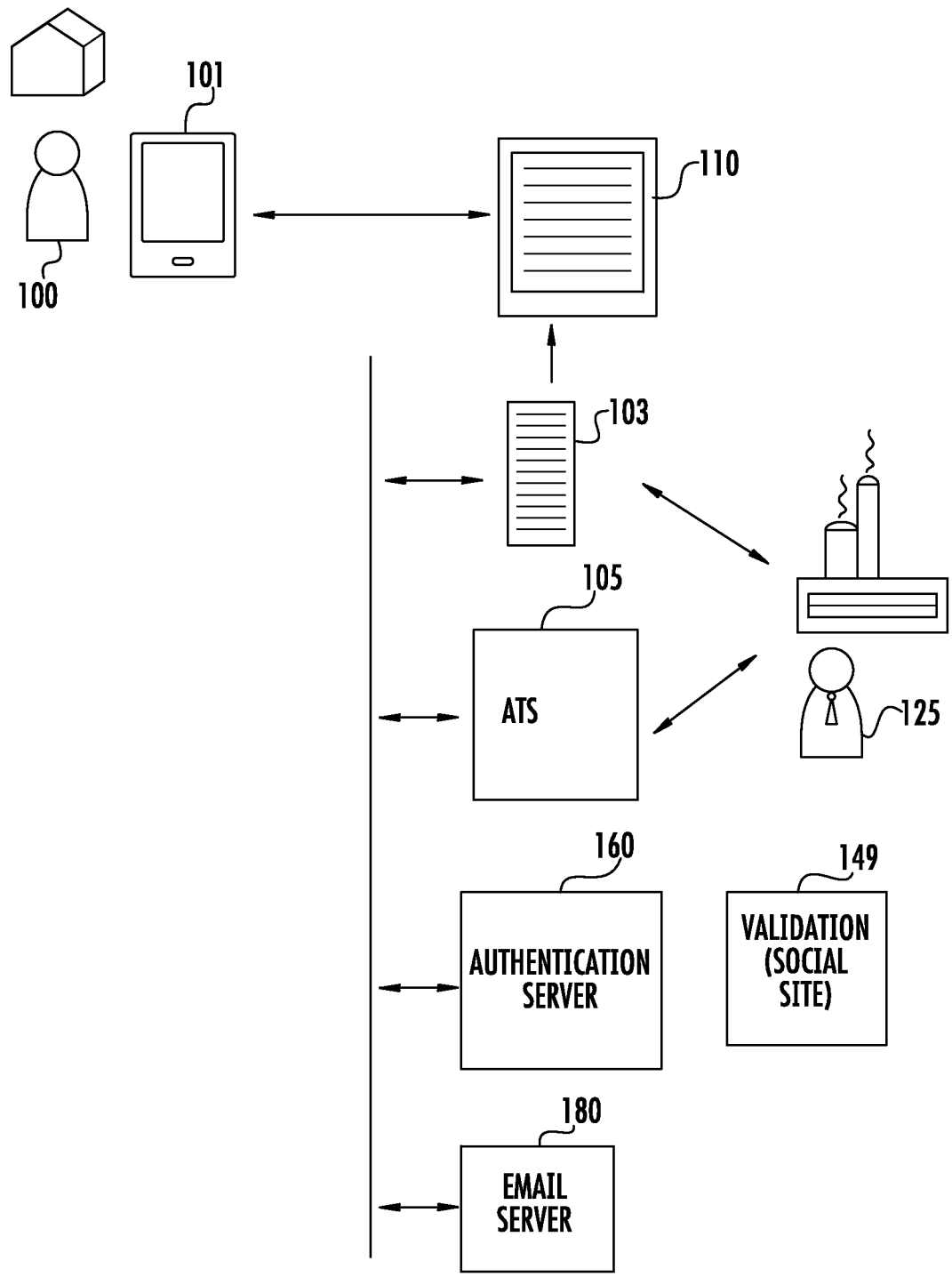
FIG. 2A is a high level system diagram showing a job applicant interacting with an employer website, an ATS, a social network, and an authentication server according to the teachings herein.

A system architecture that can provide these advantages is shown in FIG. 2A. Here, the job applicant/user 100 is using a tablet 101 connected to the Internet to interact with search engines and the like to locate an employer's 125 job application webpage 110 hosted on the employer's web server 103. The employer's website 110 and/or server 103 is provided by, or at least interacts with, an Applicant Tracking System 105 typically in a manner that is transparent to the user 100. Added to the elements of FIG. 1A are access to a validation source 149 such as a social network, an authentication server 160, and an email server 180.

Figure 2B:
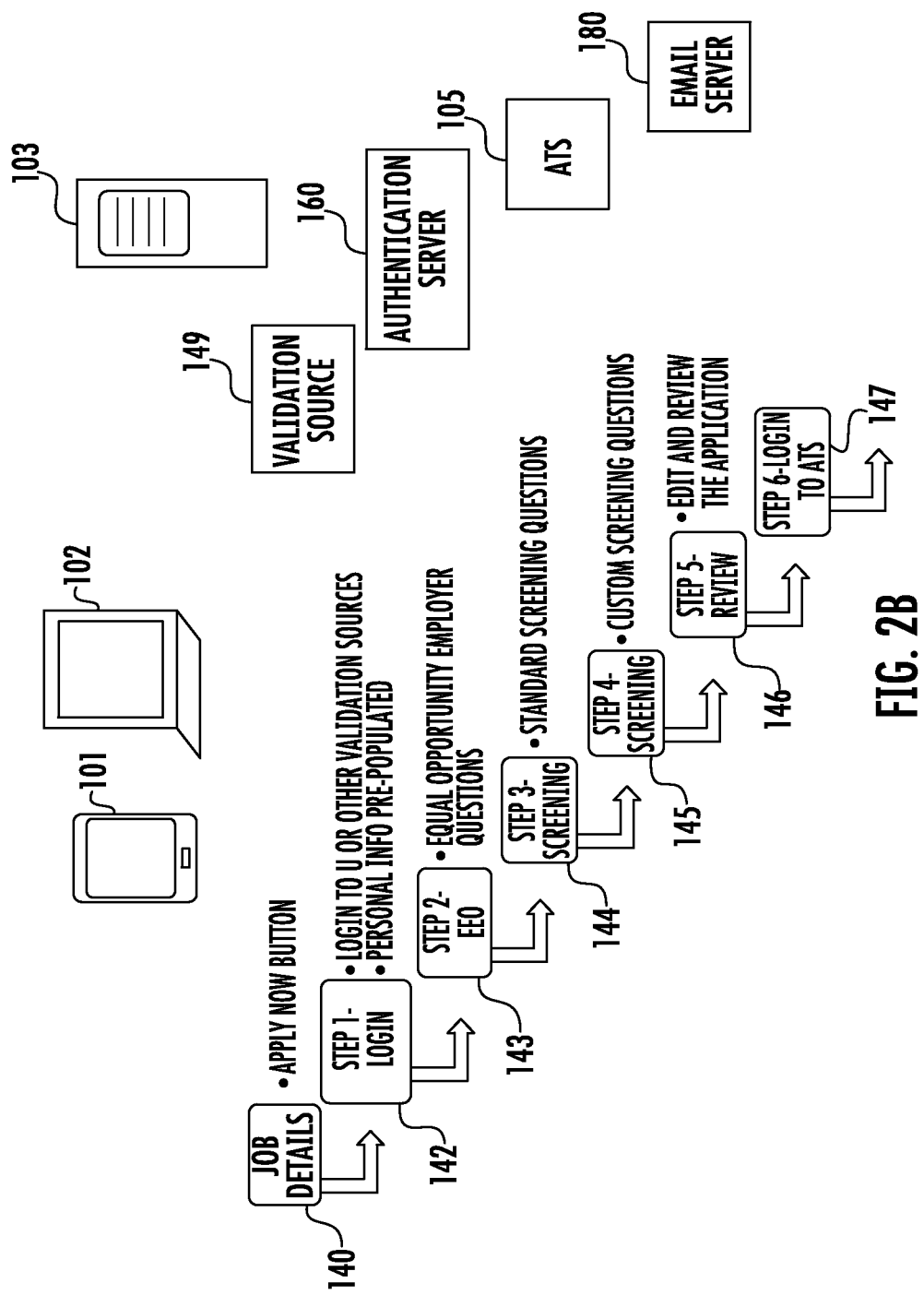
FIGS. 2B and 2C are a high level process flow of our improved process flow that avoids the problems with the process of FIGS. 1A and 1B.
Figure 2C:
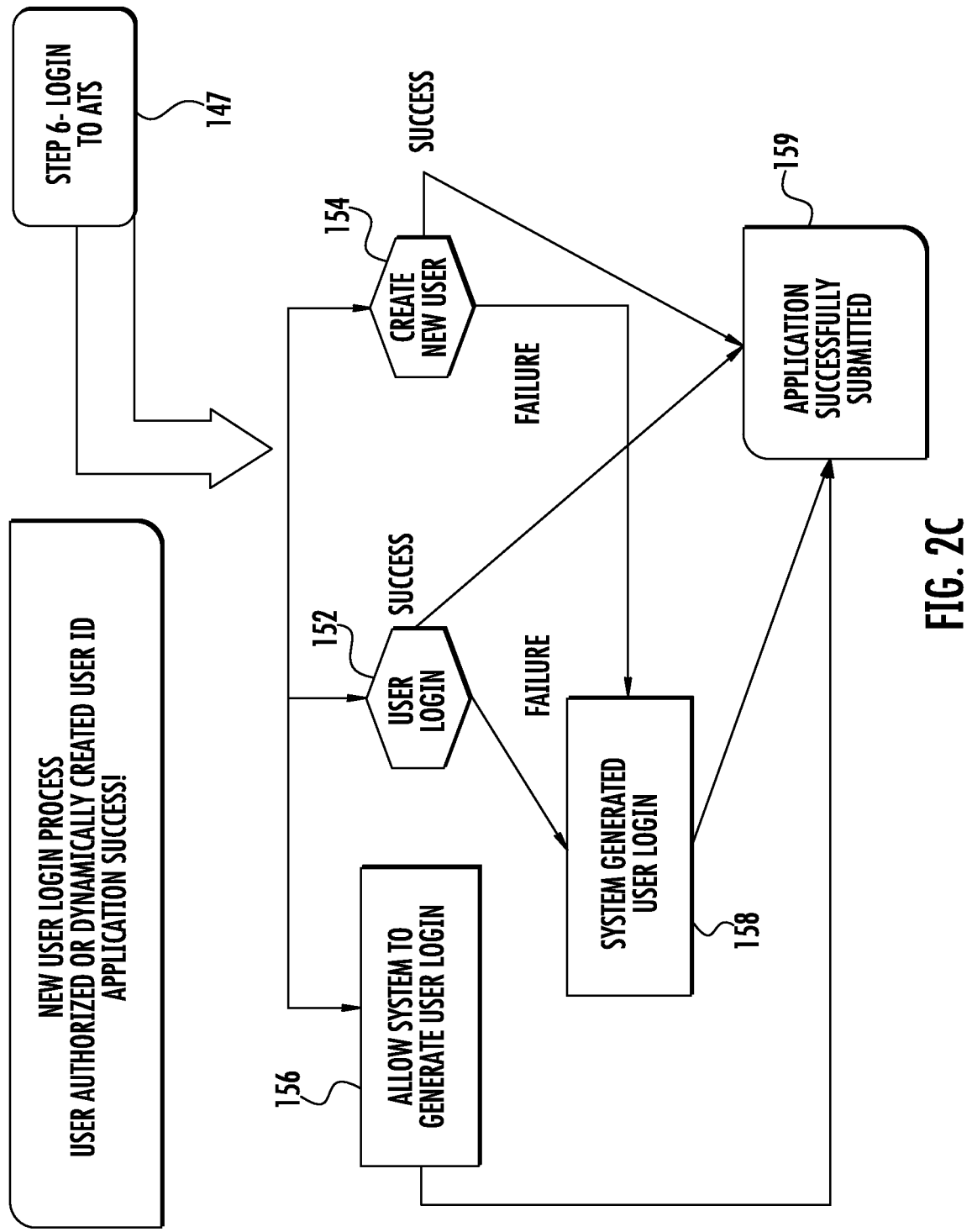

A workflow process performed by this system is shown in FIG. 2B. Briefly, the process starts at a step 140 as before, with the applicant pressing an "apply now" button in the context of the employer's website 110.

At step 142, the applicant is then asked to share a social network ID from a site such as LinkedIn, Facebook, or another user validation source 149—note that no email address or special ID specific to the job application process within ATS 103 is requested from the user at this point. Given permission to access the social network credentials, available personal information is collected by the ATS from the validation source 149 and then used to pre-populate the questionnaire. By asking the user to provide his LinkedIn account information, and having a successful return from the social network site, we have authenticated and verified the identity of the user, made sure that is a real person and also made sure that no one unauthorized is moving into the rest of the process.

The following steps may include asking EEO questions 143, standard screening 144, custom screening 145, and to review the application 146 as before. It is only after reaching the end of the review process is the user asked to specifically login to the ATS in step 147. Note however, that the user may optionally and/or voluntarily provide his email address as part of these steps.

Thus the revised process moves the ATS user login to step 147 which is late in the process, replacing an initial user login with an alternative early validation step 142. This alternative validation step 142 validates the authenticity and identity of the applicant by any other social media source (with LinkedIn being but one example).

FIG. 2B shows the alternative ATS login step 147 in more detail. There are three possibilities—either the user provides his login ID credentials 152, the user attempts to creates a new login ID 154, or the user asks the system to automatically generate a login ID 156. The goal at this point is that, even if step 152 or step 154 fails, the system will still generate an ID for the user at 158. In the new re-engineered process, if the user drops off at the user login page which is now right at the end, or selects an option to 'auto create' a login, unique login credentials (login/password) are still generated to be submitted with the completed application into the ATS 105.

Figure 3:
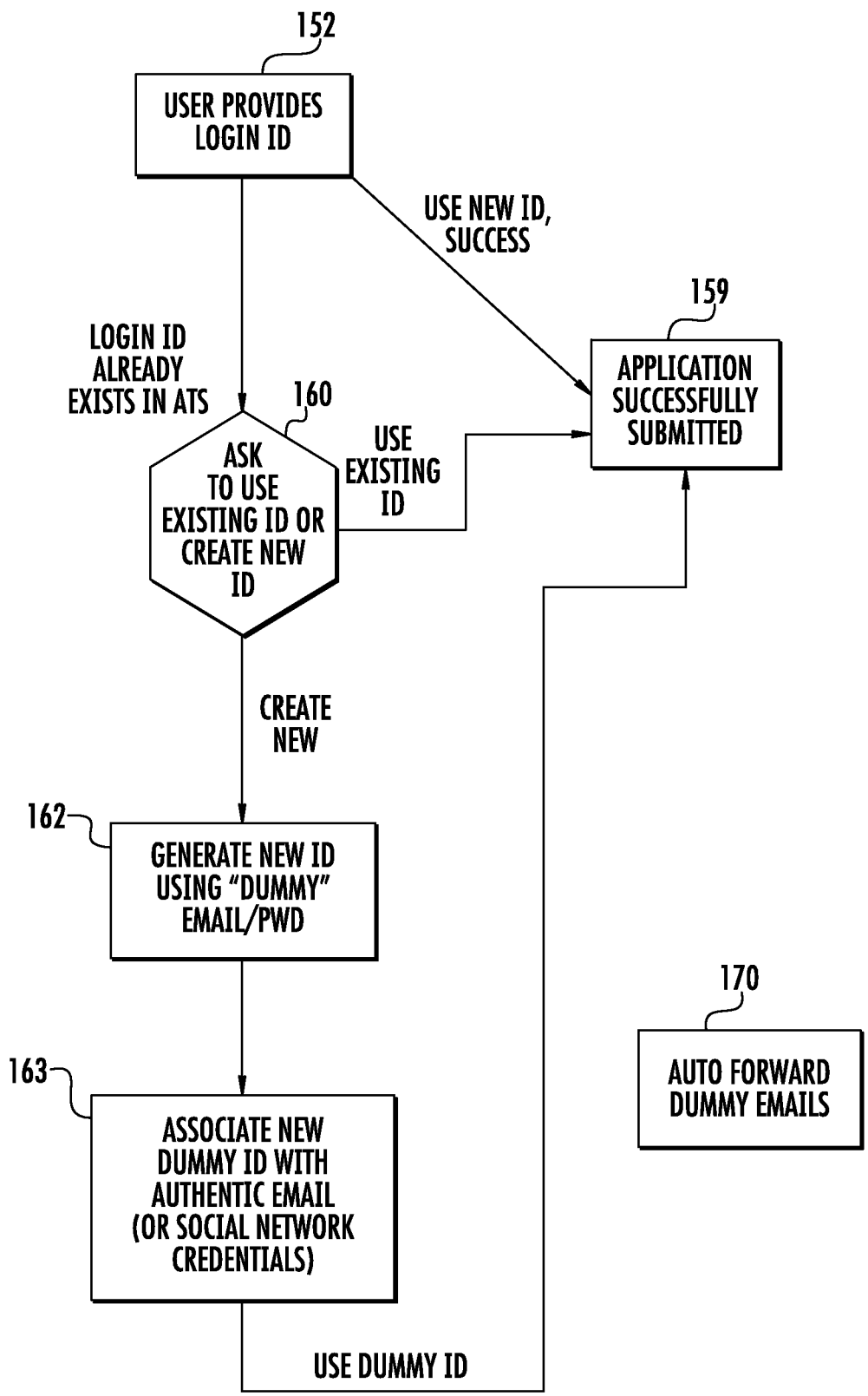
FIG. 3 is a more detailed view of dummy login ID generation.

As shown in FIG. 3, in many cases the user will successfully pass step 152 and provide his login credentials, the application will be successfully submitted 159 into the ATS 105, and the ATS 105 can send the user a conformation email directly.

However, in some cases, the ATS will reject the application because the email ID provided by the user in step 152 might already exist in the ATS 105 as being associated with an existing user profile. In that situation, we can provide two options to the user in step 160—
    i) allow use of his existing user credentials as entered in step 152 to complete the application process in step 159, or
    ii) continue to let us 'auto create' a new user login in step 162.

If the user chooses option ii) and proceeds to step 162, the system auto creates a new user login. However, it is clear that cannot be done with the user's existing email ID because an associated profile already exists in the ATS (the user's email ID is used as the unique identifier for any ATS).

In this situation, the system instead creates the new email ID using some "dummy" domain controlled by authentication server provider. The process then proceeds at step 162, using the dummy email create a new user login and generate a password.

In step 163, the newly created dummy user login and email is associated by the authentication server with to the applicant's authentic email (which is either extracted from their previously supplied Linkedin authorized access or as provided by the user).

At this point, the new dummy login can be used to continue to step 159 to submit the application to the ATS. The application data submitted can also include users authentic/real email ID. After successful submission in step 159, the ATS can then send an email communication to the user about his new user details and inform that his application was successfully submitted.

As a continuing subsequent step 170, the authentication server 160 may include an email server that creates a rule to auto forward all emails received on the dummy email address to the users authentic email. This is an important step, as the subsequent emails sent to the dummy domain could be application submission confirmation, an automatic response by the employer to the application submission, or an individual response email to the user from the company recruiter.

There is a technical possibility that user does not provide an email and has not authenticated his identity using social media (LinkedIn, etc.) when he has reached step 162. However, this should be an extremely rare situation because email ID is the unique identifier and every ATS application process requires each user to provide his email ID—otherwise the recruiter will not be able to reach out to the user. However, if there is a situation where the ATS and/or employer application process doesn't make it mandatory for the user to provide his email address or use some other sort of unique identifier, then the authentication server can use some other unique identifier (such as a phone number) to create a dummy email to create a login. From there, the process can proceed in step 163 as before.

It can now be understood that in the new re-engineered job application process, If the user drops off at any point before a user login page, the system and process can:

send the user a follow up email with a in-email form to fill in for the rest of the missing application information;

in situations where the user replies to the email with the missing information, the system can use the dummy email associated with the user ID and submit the application to the ATS (as per step 163);

even if the user does not reply to the follow up email, the data already captured before drop off can be provided to the ATS and/or employer;

if the user returns to the application process at some later time, and again uses his LinkedIn profile to identify himself, then the system can prompt the user to continue filling out the incomplete job application.

Also with the new re-engineered process, at the first instance of a user login screen/page:

the user is given an option to allow the authentication server to automatically and dynamically create a new login; the login can be pre-validated with the ATS on a real-time basis to ensure that the new login credentials will be accepted by the ATS as valid; and the user is informed by email that as instructed by him, that a new user login has been created or future reference.

As an end result, a company/employer leveraging the re-engineered process should be able to get more potential candidates to complete the application. The process essentially eliminates problems with applicants dropping off at the ATS system login/password step. As a result, it also increases the conversion of the passive job seekers (good talent), actively sought out by recruiters. The technology also allows the user to explicitly authorize creation of a random, ATS validated login credential, which may further encourage potential job candidate engagement.

What is claimed is:

1. A method for structuring electronic communication flow between a first computer system and a user computer system in a computer network when submitting information to a job Application Tracking System (ATS) comprising:

executing a program by the first computer system to structure the electronic communication flow during at least a first communication session between the first computer system and the user computer system to improve utilization of the computer systems and facilitate any subsequent communication sessions between the first computer system and the user computer system and preserving information collected during the first session, wherein executing the program causes the first computer system to perform during the first session:

a. initially validating an identity of a user via a social network and other than via ATS login and password information to begin presenting job application questions during a sign-in process to the ATS;

b. after element a., presenting the job application questions including job screening questions to the user in an interactive, on-line presentation format for a job application;

c. after element b., receiving and collecting the user's on-line answers to the job application questions;

d. after collecting the user's answers to the job application in element c., requesting the user to further verify their identity by entering ATS login credentials associated with the user;

e. after element c., detecting that the user has dropped from the application process before entering answers to all of the job application questions, but before moving to requesting ATS login credentials in element d;

f. after element e, automatically creating a dummy login name for the user; and g. submitting the collected information to the ATS with the dummy login name to make the collected information available to the user in any subsequent session between the first computer system and a computer system operated by the user.

2. The method of claim 1 wherein the step of initially validating the user's identity comprises sending data to the user computer system that causes the user computer system to ask the user to provide social network identity credentials of the user.

3. The method of claim 2 wherein executing the program further causes the first computer system to perform:

collecting personal information concerning the user from information associated with the social network identity credentials of the user.

4. The method of claim 3 and further wherein the social network identity provides Personal Identifiable Information that includes an email address for the user.

5. The method of claim 3 wherein if the user drops off from answering job application questions, and a user-provided email address does not exist in the ATS for another login, then executing the program further causes the first computer system to perform:

associating an email address to identify the user provided by a social network credential or by user manual input; and auto-creating an ATS user login associated with the email address.

6. The method of claim 3 wherein after detecting that the user has dropped off from answering job application questions, and a user-provided original email address already exists in the ATS, then executing the program further causes the first computer system to perform:

creating a dummy email address for the user; and associating the dummy email address with the user-provided original email address.

7. The method of claim 6 wherein executing the program further causes the first computer system to perform:

sending confirmation of submission of the job application using the dummy email address associated with the ATS auto-created user login; and handling subsequent communications addressed to the dummy email address by redirecting them to the user-provided original email address.

8. The method of claim 1 wherein the screening questions are presented to the user via the user computer system and answers collected from the user via the user computer system, and the user computer system is selected from a group consisting of: a computing device comprising a smartphone, tablet computer system, or desktop computer system.

9. The method of claim 1 wherein executing the program further causes the first computer system to perform:

sending information to the user computer system to cause the user computer system to ask the user if the user wishes to have an ATS system identity created for the user automatically; and using the resulting automatically created ATS system identity to identify the user in subsequent processing.

10. An apparatus comprising:

at least one processor;

memory coupled to said at least one processor, the memory including a program stored therein to structure electronic communication flow during at least a first communication session between a first computer system and a user computer system to improve utilization of the computer systems and facilitate any subsequent communication sessions between the first computer system and the user computer system and preserve information collected during the first session, wherein the program is executable by the at least one processor to:

a. initially validate an identity of a user via a social network and other than via ATS login and password information to begin presenting job application questions during a sign-in process to the ATS;

b. after element a., present the job application questions including job screening questions to the user in an interactive, on-line presentation format for a job application;

c. after element b., receive and collect the user's on-line answers to the job application questions;

d. after collection of the user's answers to the job application in element c., request the user to further verify their identity by entering ATS login credentials associated with the user;

e. after element c., detect that the user has dropped from the application process before entering answers to all of the job application questions, but before moving to requesting ATS login credentials in element d;

f. after element e, automatically creates a dummy login name for the user; and g. submit the collected information to the ATS with the dummy login name to make the collected information available to the user in any subsequent session between the first computer system and a computer system operated by the user.

11. The apparatus of claim 10 wherein to initially validate the user's identity comprises sending data to the user computer system that causes the user computer system to ask the user to provide social network identity credentials of the user.

12. The apparatus of claim 11 wherein the program is further executable by the at least one processor to:

collecting personal information concerning the user from information associated with the social network identity credentials of the user.

13. The apparatus of claim 12 and further wherein the social network identity provides Personal Identifiable Information that includes an email address for the user.

14. The apparatus of claim 12 wherein if the user drops off from answering job application questions, and a user-provided email address does not exist in the ATS for another login, then the program is further executable by the at least one processor to:

associate an email address to identify the user provided by a social network credential or by user manual input; and auto-create an ATS user login associated with the user-provided email address.

15. The apparatus of claim 12 wherein after detecting that the user has dropped off from answering job application questions, and a user-provided original email address already exists in the ATS, then the program is further executable by the at least one processor to:

create a dummy email address for the user; and associate the dummy email address with the user-provided original email address.

16. The apparatus of claim 15 wherein the program is further executable by the at least one processor to:

send confirmation of submission of the job application using the dummy email address associated with the ATS auto-created user login; and handle subsequent communications addressed to the dummy email address by redirecting them to the user's original email address.

17. The apparatus of claim 10 wherein the screening questions are presented to the user via the user computer system and answers collected from the user via the user computer system, and the user computer system is selected from a group consisting of: a computing device comprising a smartphone, tablet computer system, or desktop computer system.

18. The apparatus of claim 10 wherein the program is further executable by the at least one processor to:

send information to the user computer system to cause the user computer system to ask the user if the user wishes to have an ATS system identity created for the user automatically; and use the resulting automatically created ATS system identity to identify the user in subsequent processing.

19. A non-transitory, computer readable medium comprising:

a memory that includes a program stored therein to structure electronic communication flow during at least a first communication session between a first computer system and a user computer system to improve utilization of the computer systems and facilitate any subsequent communication sessions between the first computer system and the user computer system and preserve information collected during the first session, wherein the program is executable by the at least one processor to:
a. initially validate an identity of a user via a social network and other than via ATS login and password information to begin presenting job application questions during a sign-in process to the ATS;
b. after element a., present the job application questions including job screening questions to the user in an interactive, on-line presentation format for a job application;
c. after element b., receive and collect the user's on-line answers to the job application questions;
d. after collection of the user's answers to the job application in element c., request the user to further verify their identity by entering ATS login credentials associated with the user;
e. after element c., after element c., detect that the user has dropped from the application process before entering answers to all of the job application questions, but before moving to requesting ATS login credentials in element d;
f. after element e, then automatically create a dummy login name for the user; and
g. submit the collected information to the ATS with the dummy login name to make the collected information available to the user in any subsequent session between the first computer system and a computer system operated by the user.

* * * * *